(12) United States Patent
Handshaw et al.

(10) Patent No.: US 9,946,909 B2
(45) Date of Patent: Apr. 17, 2018

(54) ARRANGEMENT FOR AND METHOD OF TRAPPING DEBRIS IN AN ELECTRO-OPTICAL READER

(71) Applicant: SYMBOL TECHNOLOGIES, LLC, Lincolnshire, IL (US)

(72) Inventors: Darran M. Handshaw, Sound Beach, NY (US); Edward D. Barkan, Miller Place, NY (US); Mark E. Drzymala, St. James, NY (US); Carl D. Wittenberg, Water Mill, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/861,412

(22) Filed: Sep. 22, 2015

(65) Prior Publication Data

US 2017/0083732 A1    Mar. 23, 2017

(51) Int. Cl.
 *G06K 7/10* (2006.01)
 *G02B 7/02* (2006.01)
 (Continued)

(52) U.S. Cl.
 CPC ......... *G06K 7/10881* (2013.01); *G02B 7/021* (2013.01); *G02B 7/022* (2013.01);
 (Continued)

(58) Field of Classification Search
 CPC ..... G06K 2007/10485; G06K 7/10683; G06K 7/10702; G06K 7/10811; G06K 7/10831;
 (Continued)

(56) References Cited

U.S. PATENT DOCUMENTS

| | | | |
|---|---|---|---|
| 2002/0005997 A1* | 1/2002 | Oba | G02B 7/04 359/819 |
| 2005/0264670 A1* | 12/2005 | Yamaguchi | H04N 5/2254 348/335 |

(Continued)

FOREIGN PATENT DOCUMENTS

KR    20120067104 A  *  6/2012

OTHER PUBLICATIONS

English equivalent machine translation of KR 20120067104, retrieved on Sep. 2, 2017 from Korean Patent Office, http://kposd.kipo.go.kr:8088/kiponet/up/kpion/pdfView.do?langCd=EN&pdfFileName=out_PDF_cw_gaz_p_1020100128539_EN.pdf&applno=1020100128539&pdfDocType=0&docKind=KPIONPUBEAPDF.*

*Primary Examiner* — Suezu Ellis
(74) *Attorney, Agent, or Firm* — Yuri Astvatsaturov

(57) ABSTRACT

An optical assembly for an electro-optical reader includes a lens mounted in a stepped barrel. The stepped barrel has a barrel step between first and second barrel portions. The optical assembly is installed along an optical axis in a stepped chassis having a first chassis section that receives the first barrel portion with a slip fit in which a mechanical clearance exists between the first chassis section and the first barrel portion, a second chassis section that receives the second barrel portion with an engagement fit in which the second barrel portion frictionally moves against the second chassis section, and a chassis step between the first and second chassis sections. The chassis step is spaced away from the barrel step after installation of the optical assembly to bound a debris compartment to trap any debris resulting from the frictional movement of the second barrel portion against the second chassis section.

14 Claims, 4 Drawing Sheets

(51) Int. Cl.
*G02B 27/00* (2006.01)
*H04N 5/372* (2011.01)
*H04N 5/374* (2011.01)

(52) U.S. Cl.
CPC ..... *G02B 27/0006* (2013.01); *G06K 7/10831* (2013.01); *H04N 5/372* (2013.01); *H04N 5/374* (2013.01)

(58) Field of Classification Search
CPC .......... G02B 7/02; G02B 7/021; G02B 7/022; G02B 7/023; G02B 7/04; G02B 7/09; G02B 7/105; G02B 27/0006; H04N 5/2254; H04N 5/2257; G03B 9/02
USPC ....... 359/507, 508, 703, 704, 819, 821–823, 359/827, 829; 396/505, 529, 533, 541
See application file for complete search history.

(56) References Cited

U.S. PATENT DOCUMENTS

| | | | | |
|---|---|---|---|---|
| 2006/0051085 A1* | 3/2006 | Okumura | ............... | G03B 29/00 396/505 |
| 2006/0118635 A1* | 6/2006 | Joseph | ..................... | G02B 7/08 235/462.24 |
| 2007/0086770 A1* | 4/2007 | Okita | ..................... | F16F 1/324 396/133 |
| 2007/0280678 A1* | 12/2007 | Chien | ..................... | G03B 17/00 396/529 |
| 2008/0152339 A1* | 6/2008 | Westerweck | ........... | G03B 17/02 396/541 |
| 2009/0109554 A1* | 4/2009 | Christison | .............. | G02B 7/022 359/823 |
| 2009/0153707 A1* | 6/2009 | Nakao | ..................... | G02B 7/021 348/294 |
| 2009/0303591 A1* | 12/2009 | Zhang | ..................... | G02B 7/022 359/507 |
| 2011/0090581 A1* | 4/2011 | Lee | ......... | G02B 7/022 359/829 |
| 2011/0091199 A1* | 4/2011 | Lee | ......... | G03B 17/00 396/533 |
| 2011/0116177 A1* | 5/2011 | Lin | ......... | G02B 5/005 359/738 |
| 2015/0130941 A1* | 5/2015 | Bauer | .................. | G03B 17/12 348/148 |

* cited by examiner

ARRANGEMENT FOR AND METHOD OF TRAPPING DEBRIS IN AN ELECTRO-OPTICAL READER

BACKGROUND OF THE INVENTION

The present disclosure relates generally to an arrangement for, and a method of, trapping debris in an electro-optical reader for reading targets and, more particularly, to preventing any debris formed during the installation of an optical assembly in a chassis of the reader from migrating to optical surfaces of the reader, thereby degrading reader performance.

Moving laser beam readers or laser scanners, as well as solid-state imaging systems or imaging readers, have both long been used, in both handheld and hands-free modes of operation, in many industries, such as retail, manufacturing, warehousing, distribution, postal, transportation, logistics, etc., to electro-optically read targets, such as one- or two-dimensional bar code symbols to be decoded.

The known moving laser beam reader generally includes a data capture assembly or laser scan engine for electro-optically capturing data from a target. The data capture assembly includes a laser for emitting a laser beam, an optical assembly for focusing the laser beam to form a beam spot, a mirrored scan component for repetitively scanning the beam spot across the target in a scan pattern, a photodetector for detecting return light reflected and/or scattered from the target and for converting the detected light into an analog electrical signal, and signal processing circuitry including a digitizer for digitizing the analog signal, and a microprocessor or controller for decoding the digitized signal based upon a specific symbology used for the target to identify the target, and for transmitting the decoded signal, either via a wireless or wired link, to a remote host for further processing, e.g., price retrieval from a price database to obtain a price for the identified target.

The known imaging reader generally includes a data capture assembly or imaging scan engine in the housing. The data capture assembly includes a solid-state imager with an array of photocells or light sensors, and an optical assembly for capturing return light scattered and/or reflected from the target being imaged over a field of view, and for projecting the return light onto the imager to initiate capture of an image of the target. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are decoded and/or processed by a programmed microprocessor or controller into information related to the target being read, e.g., decoded data identifying the target. The controller is operative for transmitting the decoded data, either via a wireless or wired link, to a remote host for further processing, e.g., price retrieval from a price database to obtain a price for the identified target.

For either the moving laser beam reader or the imaging reader, the optical assembly generally comprises one lens, or a plurality of lenses of different optical powers, mounted in a cylindrical lens barrel. For example, in the case of an imaging reader, a classical Cooke triplet may be mounted along an optical axis in the lens barrel. Sometimes, a fourth lens is added to widen the field of view. Although each lens is traditionally made of glass for improved thermal stability, at least one or more of the lenses are typically made of plastic due to the lighter weight and lower molded fabrication cost of plastic lenses compared with glass lenses. The optical assembly comprised of the lens barrel with the lenses mounted therein is installed as a unit into a cylindrical chassis passage formed in a chassis that, in turn, is mounted in the reader. In the case of an imaging reader, the installation enables the captured light to be focused onto the imager.

There are several ways to install the optical assembly in the chassis passage. One way is to press fit the lens barrel in the chassis passage, typically by using crush ribs that are provided either on the outer circumferential surface of the lens barrel, or on the inner circumferential surface of the chassis passage. The crush ribs are radially compressed during sliding insertion of the lens barrel and form an interference fit to hold the lens barrel in place within the chassis. In the case of an imaging reader, the interference fit fixedly positions the optical assembly relative to the imager so that the optical assembly can accurately focus the captured return light onto the imager. Another way is to configure the outer diameter of the lens barrel and the inner diameter of the chassis passage with a sliding interference fit, without using crush ribs. Still another way is to provide threads on the lens barrel and in the chassis passage, and to rotatably thread the lens barrel into the chassis passage. A further way is to twist-and-lock the lens barrel into the chassis passage by first sliding the lens barrel into the chassis passage, and then turning the lens barrel about the optical axis.

A disadvantage of all of these installations is that there is a tendency for debris to be generated when the lens barrel frictionally engages and rubs against the chassis passage. The lens barrel and the chassis can each be constituted of either metal material or synthetic plastic material, and sometimes the lens barrel and the chassis can be coated with a metal plating. Whether it is plastic or metal scrapings from a crush rib compression fit, or an interference fit, or a twist-and-lock fit, or whether it is flakes from a metal plating that has been sheared off, or whether it is particles caused by a rotary threaded fit, all such scrapings, flakes and particles constitute undesirable pieces of debris, which, as experience has shown, has a tendency to fall loose and migrate to optical surfaces of the reader. For example, in the case of an imaging reader, any debris on the imager is especially problematic as the imager does not tolerate foreign debris and can create blemishes in the captured image. In the case of a moving laser beam reader, any debris on the mirrored scan component or on the photodetector is disadvantageous. Such debris contamination degrades the reader's performance.

Accordingly, it would be desirable to prevent any such debris formed during the installation of an optical assembly in a chassis of an electro-optical reader from migrating to optical surfaces of the reader and thereby degrading reader performance.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
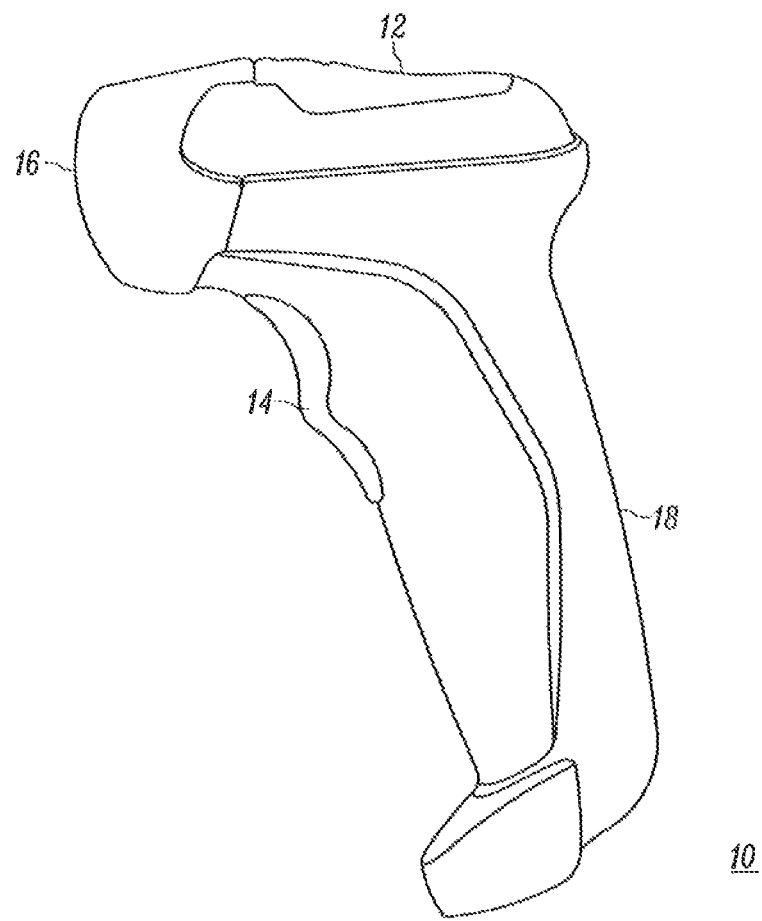
FIG. 1 is a side elevational view of an exemplary electro-optical reader in which debris is trapped in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In accordance with one feature of this disclosure, an arrangement for trapping debris in an electro-optical reader includes an optical assembly installed in a stepped chassis. The optical assembly includes a lens having an optical axis, and an annular stepped barrel in which the lens is mounted. The stepped barrel has first and second barrel portions each extending axially along the optical axis, and a barrel step between the first and second barrel portions. The stepped chassis has a first chassis section for receiving the first barrel portion with a slip fit in which a mechanical clearance exists between the first chassis section and the first barrel portion, and a second chassis section for receiving the second barrel portion with an engagement fit in which the second barrel portion frictionally moves against the second chassis section. The stepped chassis also has a chassis step between the first and second chassis sections. The chassis step is spaced away from the barrel step after installation of the optical assembly to bound a debris compartment to trap any debris resulting from the frictional movement of the second barrel portion against the second chassis section.

In a preferred embodiment, each of the first and second barrel portions is a circular cylinder, and each of the first and second chassis sections is a circular cylindrical bore. The second barrel portion advantageously has a larger outer diameter than an outer diameter of the first barrel portion. The second chassis section advantageously has a larger inner diameter than an inner diameter of the first chassis section. The first chassis section preferably has an inner diameter that is greater than an outer diameter of the first barrel portion, and the second chassis section preferably has an inner diameter that is less than an outer diameter of the second barrel portion. The engagement fit is either a press fit, or an interference fit, or a friction fit, or a crushed rib compression fit, or a threaded fit, or a twist-and-lock fit.

In the case of an imaging reader, a solid-state imager is mounted in the electro-optical reader, and the optical assembly is inserted along the optical axis to image a target onto the imager. The slip fit between the first barrel portion and the first chassis section is closer to the imager than the engagement fit between the second barrel portion and the second chassis section. Any debris is trapped in the debris compartment away from the imager. In the case of a moving laser beam reader, a laser and optical components are mounted in the electro-optical reader, and the optical assembly is inserted along the optical axis to focus a laser beam from the laser. The slip fit between the first barrel portion and the first chassis section is closer to the optical components than the engagement fit between the second barrel portion and the second chassis section. Any debris is trapped in the debris compartment away from the optical components.

The stepped barrel and the stepped chassis are each constituted of a synthetic plastic material or a metal material. The lens barrel and the chassis can be coated with a metal plating. Whether it is plastic or metal scrapings from a crush rib compression fit, or an interference fit, or a twist-and-lock fit, or whether it is flakes from a metal plating that has been sheared off, or whether it is particles caused by a rotary threaded fit, all such scrapings, flakes and particles constitute undesirable pieces of debris, which has a tendency to fall loose and migrate to optical surfaces of the reader. In accordance with this disclosure, the debris compartment traps such debris of either the plastic and/or the metal materials caused by the frictional movement of the second barrel portion against the second chassis section.

In accordance with still another feature of this disclosure, a method of trapping debris in an electro-optical reader, is performed by mounting a lens having an optical axis in an annular stepped barrel having first and second barrel portions to form an optical assembly, by forming a barrel step between the first and second barrel portions, by installing the optical assembly along the optical axis in a stepped chassis having first and second chassis sections, by forming a chassis step between the first and second chassis sections, by receiving the first barrel portion in the first chassis section with a slip fit in which a mechanical clearance exists between the first chassis section and the first barrel portion, by receiving the second barrel portion in the second chassis section with an engagement fit in which the second barrel portion frictionally moves against the second chassis section, and by spacing the chassis step away from the barrel step after installing the optical assembly to bound a debris compartment to trap any debris resulting from the frictional movement of the second barrel portion against the second chassis section.

Turning now to the drawings, reference numeral 10 in FIG. 1 generally identifies an ergonomic electro-optical reader configured as a gun-shaped housing having an upper barrel or body 12 and a lower handle 18 tilted away from the body 12. A window 16 is located adjacent the front or nose of the body 12. The reader 10 is held in an operator's hand and used in a handheld mode in which a trigger 14 is manually depressed to initiate reading of targets, especially bar code symbols, in a range of working distances relative to the window 16. Although the housing has been shown as gun-shaped, this is merely exemplary, because housings of many other configurations and types can also be employed. For example, the housing need not be handheld, but can be supported by a base for supporting the reader on a countertop or like support surface, in which case, the reader can be used in a hands-free mode as a stationary workstation in which targets are slid or swiped past, or presented to, the window 16. As other examples, the housing can be configured as a vertical slot scanner having a generally vertically arranged, upright window, or as a flat-bed or horizontal slot scanner having a generally horizontally arranged window, or as a bi-optical, dual window scanner having both generally horizontally and vertically arranged windows.

Figure 2:
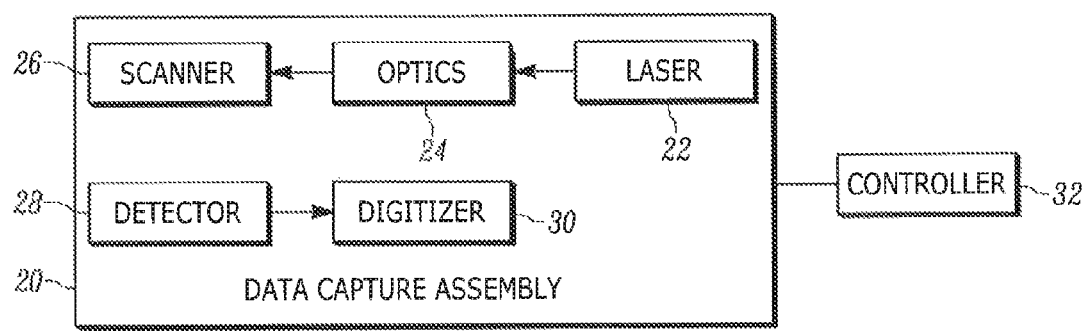
FIG. 2 is a schematic diagram of one embodiment of a data capture assembly for use in the reader of FIG. 1 when the reader is a moving laser beam reader.

In one embodiment, the reader 10 is a moving laser beam reader and, as shown in FIG. 2, a data capture assembly 20 or laser scan engine is mounted in the reader 10 for electro-optically capturing data from a target. The data capture assembly 20 includes a laser 22 for emitting a laser beam through the window 16, a focusing optical assembly or optics 24 for focusing the laser beam to form a beam spot having a certain size at a focal plane in a range of working distances relative to the window 16, a mirrored scan component or scanner 26 for repetitively scanning the beam spot across the target in a scan pattern, for example, a scan line, across the target multiple times per second, e.g., forty times per second, a photodetector 28 for detecting return light reflected and/or scattered from the target and for converting the detected light into an analog electrical signal, and signal processing circuitry including a digitizer 30 for digitizing the analog signal, and a microprocessor or controller 32 for decoding the digitized signal based upon a specific symbology used for the target to identify the target, and for transmitting the decoded signal, either via a wireless or wired link, to a remote host for further processing, e.g., price retrieval from a price database to obtain a price for the identified target.

Figure 3:
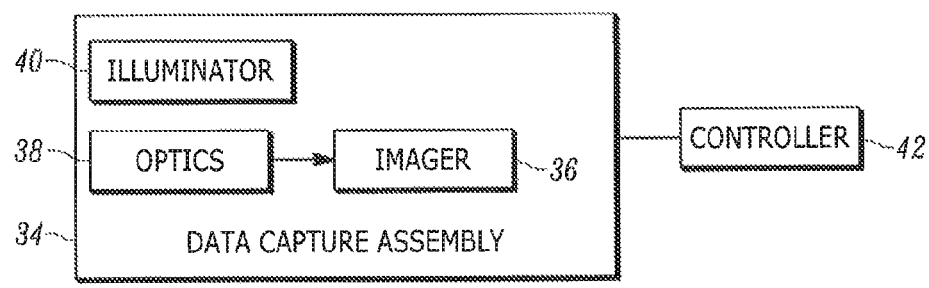
FIG. 3 is a schematic diagram of another embodiment of a data capture assembly for use in the reader of FIG. 1 when the reader is an imaging reader.

In another embodiment, the reader 10 is an imaging reader and, as shown in FIG. 3, a data capture assembly 34 or imaging scan engine is mounted in the reader 10 and includes a solid-state image sensor or imager 36 with an array of photocells or light sensors (also known as pixels), an illumination assembly or illuminator 40 for illuminating the target, and an imaging optical assembly or optics 38 for capturing return illumination light scattered and/or reflected from the target being imaged through the window 16 over an imaging field of view, and for projecting the return light onto the imager 36 to initiate capture of an image of the target over a range of working distances in which the target can be read. Such an imager 36 may include a one- or two-dimensional charge coupled device (CCD) or a complementary metal oxide semiconductor (CMOS) device and associated circuits for producing and processing electrical signals corresponding to a one- or two-dimensional array of pixel data over the imaging field of view. These electrical signals are decoded and/or processed by a programmed microprocessor or controller 42 into information related to the target being read, e.g., decoded data identifying the target. The controller 42 is operative for transmitting the decoded data, either via a wireless or wired link, to a remote host for further processing, e.g., price retrieval from a price database to obtain a price for the identified target.

Figure 4:
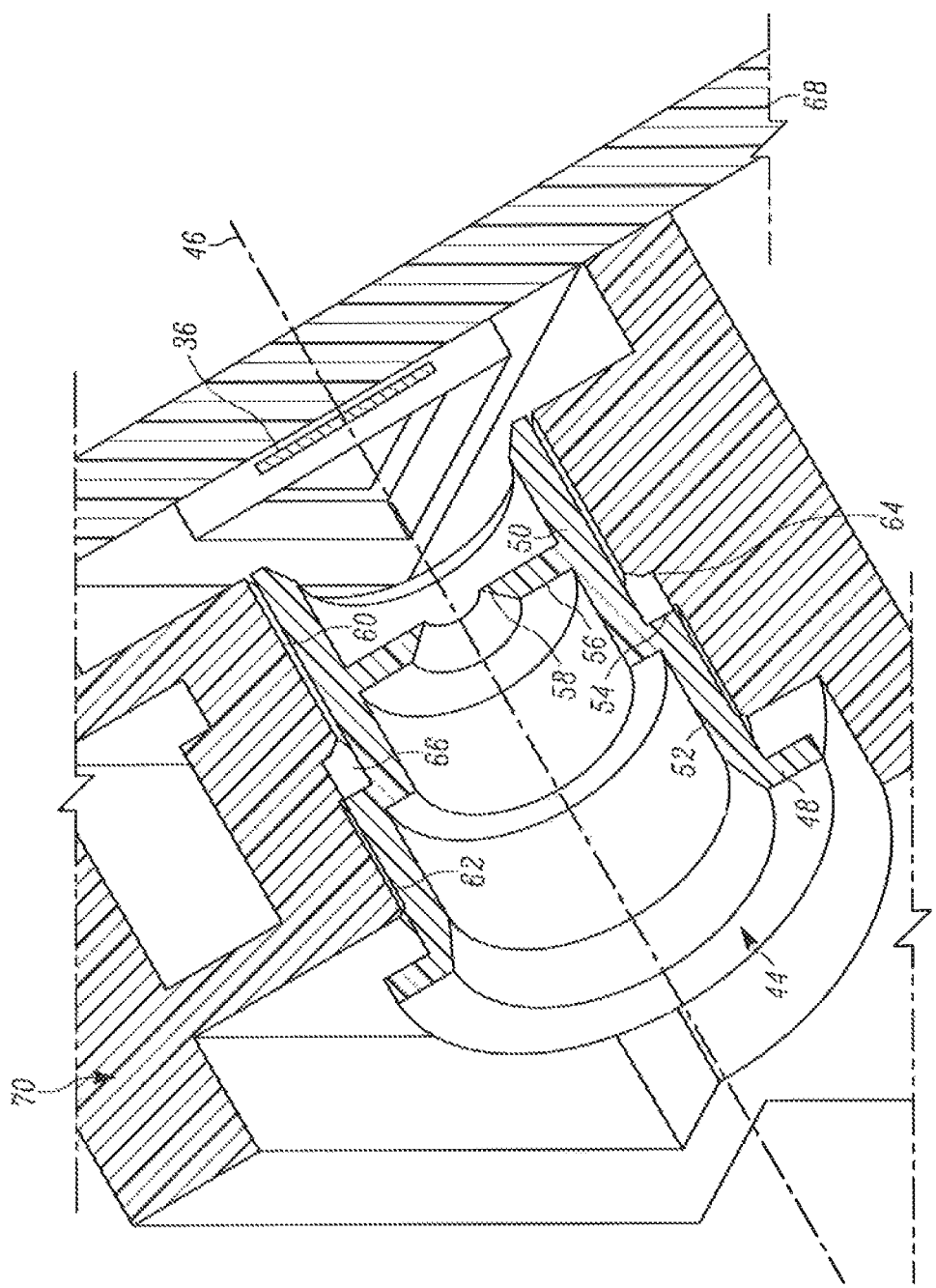
FIG. 4 is an enlarged, broken-away, isometric, perspective view of an arrangement for trapping debris for use in the reader of FIG. 1 in accordance with this disclosure, and depicts an optical assembly installed in a chassis, but with its lenses removed for clarity.
Figure 5:
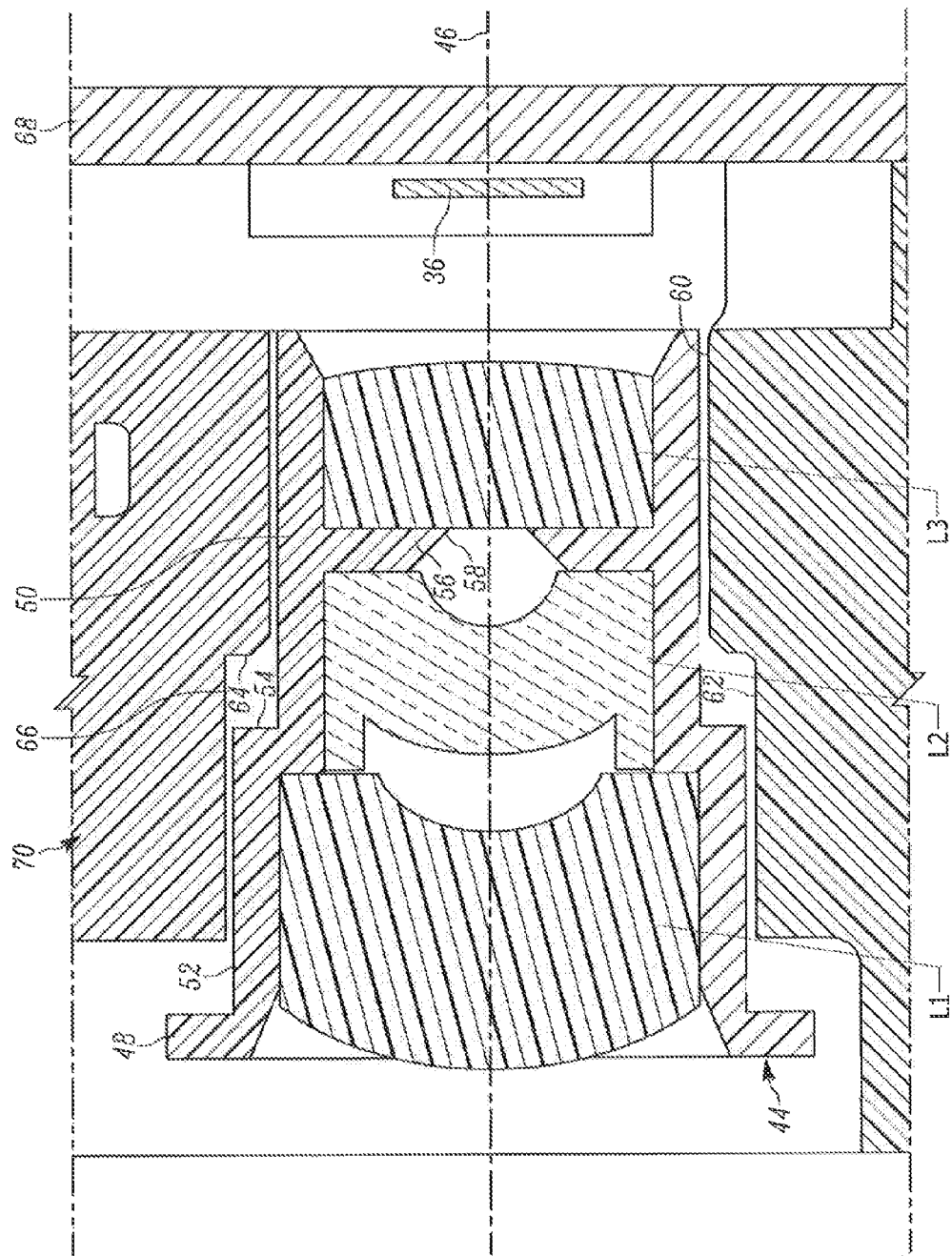
FIG. 5 is an enlarged, cross-sectional view of the arrangement of FIG. 4, but with the lenses added.

The optics 24 and the optics 38, each hereinafter being referred to as an "optical assembly," includes, in accordance with this disclosure, and as shown in FIGS. 4-5, an annular, hollow, cylindrical, stepped barrel 44 in which at least one lens, and preferably a plurality of lenses L1, L2, and L3, is mounted and arranged in succession along an optical axis 46. The lenses are not shown in FIG. 4 for clarity of illustration, but are shown in FIG. 5. The stepped barrel 44 has a first barrel portion 50 and a second barrel portion 52, each extending axially along the optical axis 46. Each of the first and second barrel portions 50, 52 is a right circular cylinder. The second barrel portion 52 has a larger outer diameter than an outer diameter of the first barrel portion 50, thereby forming an annular, external, barrel step 54 between the first and second barrel portions 50, 52. The stepped barrel 44 also has an annular end flange 48, and an internal aperture stop 56 formed with a central aperture 58. As shown in FIG. 5, the aperture stop 56 is sandwiched between the lenses L2 and L3 and is part of the optical assembly.

The stepped barrel 44 is preferably made of a plastic material, but can also be made of a metal material, and may further be coated with a metal plating. In the case of an imaging reader, as shown in FIGS. 4-5, the imager 36 is mounted on a printed circuit board 68 away from one end of the stepped barrel 44. At the opposite end of the stepped barrel 44, the end flange 48 has an entrance opening through which return light enters the stepped barrel 44. The return light passes through, and is focused by, the group of lenses and the aperture 58 along the optical axis 46 en route to the imager 36. Lenses L1 and L3 are each preferably made of a plastic material, and lens L2 is preferably made of glass. Lenses L1 and L3 preferably each have a positive optical power, and lens L2 preferably has a negative optical power. The aperture stop 56 also acts as a baffle to block stray light reflections off the surfaces of the lenses inside the stepped barrel 44.

The optical assembly is axially installed along the optical axis 46 into a stepped chassis 70 that, in turn, is mounted in the reader 10. The stepped chassis 70 has a first chassis section 60, preferably a right circular cylindrical bore, for receiving the first barrel portion 50 with a slip fit in which a mechanical clearance exists between the first chassis section 60 and the first barrel portion 50, and a second chassis section 62, preferably a right circular cylindrical bore, for receiving the second barrel portion 52 with an engagement fit in which the second barrel portion 52 frictionally moves against the second chassis section 62. Each first and second chassis section 60, 62 is a passageway extending axially along the optical axis 46. The second chassis section 62 has a larger inner diameter than an inner diameter of the first chassis section 60, thereby forming an annular chassis step 64 between the first and second chassis sections 60, 62. The chassis step 64 is spaced away from, and faces, the barrel step 54 after installation of the optical assembly in the chassis 70 to bound an annular debris compartment 66, as explained below, to trap any debris resulting from the frictional movement of the second barrel portion 52 against the second chassis section 62.

The stepped chassis 70 is preferably made of a cast metallic material, but can also be made of a plastic material, and may further be coated with a metal plating. Thus, the constitution of the stepped barrel 44/stepped chassis 70 can be plastic/plastic, plastic/metal, metal/plastic, or metal/metal. The first chassis section 60 has an inner diameter that is greater than an outer diameter of the first barrel portion 50, and the slip fit thereby created allows the first barrel portion 50 to axially and freely slide with a snug, close, tight, mechanical clearance along the first chassis section 60. By contrast, the second chassis section 62 has an inner diameter that is less than an outer diameter of the second barrel portion 52, and the engagement fit thereby created requires significantly more force to be exerted to insert the second barrel portion 52 into the second chassis section 62. The engagement fit can be a press fit, or an interference fit, or a friction fit, or a crushed rib compression fit, or a threaded fit, or a twist-and-lock fit.

The greater force exerted, and the greater friction generated, during the movement of the second barrel portion 52 rubbing against the second chassis section 62 can generate plastic and/or metal scrapings, flakes and particles from the materials and/or platings of the second barrel portion 52 and the second chassis section 62. All such scrapings, flakes and particles constitute undesirable pieces of debris, which has a tendency to fall loose and migrate to optical surfaces of the reader 10. For example, in the case of an imaging reader, any debris on the imager 36 is especially problematic as the imager 36 does not tolerate foreign debris and generates blemishes in the captured image. In the case of a moving laser beam reader, any debris on the mirrored scan component 26 or on the photodetector 28 is disadvantageous. Hence, in accordance with this disclosure, any such debris is trapped in the debris compartment 66 and is prevented from migrating to any optical surfaces in the reader 10.

The optical assembly can be inserted into the chassis 70 in either direction along the optical axis 46. The axial lengths and radial dimensions of the barrel portions and of the chassis sections are so configured that the slip fit between the first barrel portion 50 and the first chassis section 60 is made before the engagement fit between the second barrel portion 52 and the second chassis section 62 is made. This insures that once the engagement fit has begun, any pieces of debris will be caught and stopped by the slip fit between the first barrel portion 50 and the first chassis section 60. The slip fit between the first barrel portion 50 and the first chassis section 60 is closer to the imager 36 than the engagement fit between the second barrel portion 52 and the second chassis section 62. A vacuum grease, which is an inert, non-outgassing grease, can fill the mechanical clearance between the first barrel portion 50 and the first chassis section 60 to provide an extra measure of protection to catch any debris that may escape the debris compartment 66.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or arrangement that comprises, has, includes, contains a list of elements does not include only those elements, but may include other elements not expressly listed or inherent to such process, method, article, or arrangement. An element proceeded by "comprises . . . a," "has . . . a," "includes . . . a," or "contains . . . a," does not, without more constraints, preclude the existence of additional identical elements in the process, method, article, or arrangement that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or arrangement described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus for trapping debris in an electro-optical reader, the apparatus comprising:
   a first lens having an optical axis;
   a stepped barrel having:
      a first barrel portion extending axially along the optical axis;

a second barrel portion extending axially along the optical axis, the first barrel portion and the second barrel portion being non-overlapping in a direction of the optical axis; and a barrel step between the first barrel portion and the second barrel portion; and a stepped chassis in which the stepped barrel is installed along the optical axis, the stepped chassis having:

a first chassis section configured to receive the first barrel portion with a slip fit in which a mechanical clearance is located between the first chassis section and the first barrel portion;

a second chassis section configured to receive the second barrel portion with an engagement fit in which the second barrel portion frictionally engages the second chassis section at least partially along the direction of the optical axis; and a chassis step between the first chassis section and the second chassis section, the chassis step being spaced away from the barrel step to bound a debris compartment, wherein an inner diameter of the first chassis section is greater than an outer diameter of the first barrel portion, and wherein an inner diameter of the second chassis section is less than an outer diameter of the second barrel portion prior to insertion of the stepped barrel into the stepped chassis via the engagement fit.

2. The apparatus of claim 1, wherein the first barrel portion is longer than the second chassis section.

3. The apparatus of claim 1, wherein an inner diameter of the first chassis section is smaller than an outer diameter of the second barrel portion.

4. The apparatus of claim 1, further comprising a second lens, wherein the first lens is positioned at least partially within the first barrel portion, and wherein the second lens is positioned at least partially within the second barrel portion.

5. The apparatus of claim 1, wherein the each of the first barrel portion and the second barrel portion is a circular cylinder, and wherein each of the first chassis section and the second chassis section is a circular cylindrical bore.

6. The apparatus of claim 1, wherein the engagement fit is one of a press fit, an interference fit, a friction fit, a crushed rib compression fit, a threaded fit, and a twist-and-lock fit.

7. The apparatus of claim 1, further comprising a data capture assembly, wherein:

the stepped barrel is inserted along the optical axis to image a target onto the data capture assembly; and the slip fit between the first barrel portion and the first chassis section is closer to the data capture assembly than the engagement fit between the second barrel portion and the second chassis section, wherein the data capture assembly includes one of a solid-state imager or a photodetector.

8. The apparatus of claim 1, wherein the first barrel portion, the second barrel portion, the first chassis section, and the second chassis section have axial a respective length and a respective dimension such that the slip fit between the first barrel portion and the first chassis section is made before the engagement fit between the second barrel portion and the second chassis section is made.

9. A method of trapping debris in an electro-optical reader, the method comprising the steps of:

mounting a first lens having an optical axis in a stepped barrel having a first barrel portion and a second barrel portion, the first barrel portion and the second barrel portion being non-overlapping in a direction of the optical axis, the stepped barrel further having a barrel step between the first barrel portion and the second barrel portion; and installing the stepped barrel in a stepped chassis having a first chassis section and a second chassis section, the stepped chassis further having a chassis step between the first chassis section and the second chassis section, wherein the installing step includes:

receiving the first barrel portion in the first chassis section with a slip fit in which a mechanical clearance is formed between the first chassis section and the first barrel portion;

after the receiving the first barrel portion in the first chassis section, receiving the second barrel portion in the second chassis section with an engagement fit in which the second barrel portion frictionally engages the second chassis section; and positioning the stepped barrel relative to the stepped chassis such that the chassis step and the barrel step form a compartment operable to trap debris resulting from the installing step, wherein an inner diameter of the first chassis section is greater than an outer diameter of the first barrel portion, and wherein an inner diameter of the second chassis section is less than an outer diameter of the second barrel portion prior to the installing the stepped barrel in a stepped chassis.

10. The method of claim 9, wherein the electro-optical reader includes a data capture assembly, the data capture assembly being one of a solid-state imager or a photodetector, and wherein the method further includes the step of positioning the stepped chassis relative to the data capture assembly such that the first chassis section is closer to the data capture assembly than the second chassis section.

11. The method of claim 9, wherein the first barrel portion is longer than the second chassis section.

12. The method of claim 9, wherein an inner diameter of the first chassis section is smaller than an outer diameter of the second barrel portion.

13. The method of claim 9, further comprising mounting a second lens in the stepper barrel, wherein the first lens is mounted at least partially within the first barrel portion, and wherein the second lens is mounted at least partially within the second barrel portion.

14. The method of claim 9, further comprising configuring the engagement fit as one of a press fit, an interference fit, a friction fit, a crushed rib compression fit, a threaded fit, and a twist-and-lock fit.

* * * * *